US009006953B2

(12) United States Patent
Wei et al.

(10) Patent No.: US 9,006,953 B2
(45) Date of Patent: Apr. 14, 2015

(54) STATOR ASSEMBLY STRUCTURE FOR AXIAL FLUX ELECTRIC MACHINE

(75) Inventors: Tseng-Te Wei, Hsinchu (TW); Shian-Hsuan Huang, Hsinchu (TW); Huan-Lung Gu, Hualien County (TW); Shih-Ming Lo, Hsinchu (TW); Li-Ju Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 312 days.

(21) Appl. No.: 13/561,865

(22) Filed: Jul. 30, 2012

(65) Prior Publication Data

US 2013/0140920 A1 Jun. 6, 2013

(30) Foreign Application Priority Data

Dec. 2, 2011 (TW) .............................. 100144498 A (51) Int. Cl.
*H02K 15/00* (2006.01)
*H02K 21/24* (2006.01)
*H02K 1/14* (2006.01)
*H02K 1/18* (2006.01)
*H02K 9/19* (2006.01)
(Continued)

(52) U.S. Cl.
CPC ................ *H02K 15/00* (2013.01); *H02K 21/24* (2013.01); *H02K 1/02* (2013.01); *H02K 1/14* (2013.01); *H02K 1/182* (2013.01); *H02K 1/20* (2013.01); *H02K 7/006* (2013.01); *H02K 9/19* (2013.01); *H02K 9/22* (2013.01); *H02K 15/022* (2013.01); *H02K 16/00* (2013.01)

(58) Field of Classification Search
CPC ..... H02K 1/182; H02K 7/006; H02K 15/022; H02K 15/00

USPC ........... 310/216.001–216.137, 266, 267, 268; 29/596
See application file for complete search history.

(56) References Cited

U.S. PATENT DOCUMENTS 3,061,075 A   10/1962  Wise
4,839,552 A *  6/1989  Takaba ........................ 310/268
(Continued)

FOREIGN PATENT DOCUMENTS

JP    2006333593 A    12/2006
TW        261300       10/1995

OTHER PUBLICATIONS

Taiwan Patent Office, Office Action, Patent Application Serial No. TW100144498, Aug. 5, 2014, Taiwan.
(Continued)

*Primary Examiner* — Hanh Nguyen
(74) *Attorney, Agent, or Firm* — Rabin & Berdo, P.C.

(57) ABSTRACT

A stator assembly structure for an axial flux electric machine is designed. The back iron for each silicon steel disk stator is formed into a specific structure with tooth-like protrusions for allowing the same to be integrated with the disk-type stator seat, while the disk-type stator seat is made of a material suitable for casting or mold forming. A coil is mounted on the disk stator, and a stator assembly is achieved by integrating the stator, the coil and the stator seat. The stator and the disk-type stator seat of the stator assembly are manufactured by using a one-piece cast or one-piece mold forming method so as to enable the contact surfaces of the stator and the stator seat to engage with each other even more tightly, and consequently enable the heat generated from the coil to be transmitted rapidly from the disk stator to the disk-type stator seat.

6 Claims, 9 Drawing Sheets

(51) Int. Cl.

| | |
|---|---|
| H02K 1/02 | (2006.01) |
| H02K 1/20 | (2006.01) |
| H02K 7/00 | (2006.01) |
| H02K 9/22 | (2006.01) |
| H02K 15/02 | (2006.01) |
| H02K 16/00 | (2006.01) |

(56) References Cited

U.S. PATENT DOCUMENTS

| | | | | |
|---|---|---|---|---|
| 5,208,503 | A * | 5/1993 | Hisey | 310/216.054 |
| 5,646,467 | A | 7/1997 | Floresta et al. | |
| 6,446,324 | B1 | 9/2002 | Takarasawa et al. | |
| 6,922,004 | B2 | 7/2005 | Hashimoto et al. | |
| 2007/0241634 | A1 * | 10/2007 | Tenhunen | 310/268 |
| 2008/0148794 | A1 * | 6/2008 | Patterson et al. | 72/130 |
| 2008/0284254 | A1 * | 11/2008 | Munk et al. | 310/12 |
| 2010/0148611 | A1 | 6/2010 | Wang et al. | |
| 2010/0164316 | A1 | 7/2010 | Langford et al. | |

OTHER PUBLICATIONS

González et al., "Design Consideration to Reduce Cogging Torque in Axial Flux Permanent-Magnet Machines", IEEE Transactions on Magnetics, vol. 43, No. 8, pp. 3435-3440, Aug. 2007.

Choi et al., "Design and Parametric Analysis of Axial Flux PM Motors With Minimized Cogging Torque", IEEE Transactions on Magnetics, vol. 45, No. 6, pp. 2855-2858, Jun. 2009.

Sugyo et al., "Bi-2223 Field-Poles Without Iron Core for an AxialType of HTS Propulsion Motor", IEEE Transactions on Applied Superconductivity, vol. 19, No. 3, pp. 1687-1691, Jun. 2009.

Versele et al., "Analytical design of an axial flux permanent magnet in-wheel synchronous motor for electric vehicle", Power Electronics and Applications, 2009. EPE '09. 13th European Conference on, pp. 1-9, Jun. 2009.

* cited by examiner

STATOR ASSEMBLY STRUCTURE FOR AXIAL FLUX ELECTRIC MACHINE

BACKGROUND

1. Field

The present invention relates to a stator assembly structure for an axial flux electric machine, and more particularly, to an architecture of a junction surface of the stator and the disk-type stator seat formed with at least one tooth-like engagement structure; the stator manufactured by cutting or punching a silicon steel easily produces concave grooves or convex teeth on the axial surface of the stator; no matter whether the disk-type stator seat is made of a metal material such as Al or Mg by casting or a non-metallic material with good thermal conductivity such as an engineering plastic by mold forming, the stator of the present invention has the junction surface with the tooth-like structure like a groove channel that allows the liquid disk-type stator seat material to flow easily so as to enable the stator and the disk-type stator seat made of different materials to be integrated more easily by casting or mold forming, and the tooth-like structure enables the junction surface to bear a larger rotation stress.

2. Related Art

Along with the progress of the rare earth material science, a permanent magnet of a very small volume may generate a very large magnetic torque, so that the research and development direction of the electric machine is increasingly developed towards the high-power density. In other words, the power generated in the unit volume and weight becomes larger, so the electromagnetic field generated by the coil needs to improve the power accordingly, that is, the current passing the coil or the voltage on the coil is improved. Generally, the winding of the conventional coil made of a good conductive wire material of a low resistance (such as a copper wire material) still produces a tiny electric impedance. The tiny electric impedance may still produce power loss (i.e. copper loss) under the function of large current, and the copper loss of the coil may be dissipated in the form of heat. If the heat cannot be rapidly transmitted to the outside, the heat is accumulated to cause the increasing of the temperature of the coil and burn-out of the electric insulating coating of the coil. Generally, the coil is wound on a stator and the stator generates an eddy current under the electromagnetic field. The eddy current may generate the power loss in the ferrous material with a relatively high electric impedance (i.e. ferrous loss). The ferrous loss is also dissipated in the form of heat, and although the stator may be fabricated by the silicon steel material to reduce the influence of the eddy current, in the situation of large current direction variance or high frequency, the ferrous loss proportion rises to an extremely large ratio and the heat of the ferrous loss is accumulated on the heat of the copper loss, thus enhancing the overheat phenomenon of the coil. If the heat generated by the copper loss and the ferrous loss cannot be rapidly transmitted to the outside, the temperature accumulated on the coil becomes higher, which may generate a heat shock on the enameled wire of the coil. The high temperature may accelerate the aging and deterioration of the electric insulating coating between the wires of the coil. If the temperature exceeds the temperature that can be endured by the electric insulating coating (generally around 130-160° C.), the electric insulating coating is punched, thus causing the short circuit burn-out and failure of the coil. Therefore, how to improve the heat dissipation capability of the stator assembly becomes the technical key point for the axial flux electric machine of high torque density. Generally, in the prior art, a good thermal conductivity material (such as, Al material) is adopted for manufacturing the disk-type stator seat and a forced air cooling or water cooling method is applied on the disk-type stator seat to enhance the heat dissipation capability of the disk-type stator seat and also enhance the heat dissipation capability of the stator assembly indirectly, which is a good implementation structure.

The heat generated by the stator and the coil is mostly transmitted to the disk-type stator seat from the stator, and is dissipated by the disk-type stator seat in the air cooling or water cooling manner. Since the thermal energy needs to flow through the junction surface between the stator and the disk-type stator seat, if the structure between the stator and the disk-type stator seat does not generate a sufficient contact surface area, the coefficient of thermal conductivity of the junction surface is quite low (i.e. the thermal impedance is very large) so the heat is hard to pass. That is to say, the heat of the copper loss of the coil and the ferrous loss of the stator is difficult to flow to the disk-type stator seat. Even if the disk-type stator seat has a good heat dissipation capability, the entire stator assembly still cannot endure the high power working as the temperature is extremely high. Therefore, it is a crucial technique key to provide a good design of the structure between the stator and the disk-type stator seat.

The conventional method for fabricating the stator assembly is fixing the stator and the disk-type stator seat by a screw-fastening method, a high-performance adhesive attaching method or both. To ensure the air gap between the stator and the rotator, i.e. control the axial size tolerance between the stator and the disk-type stator seat so as to achieve a very high precision and a very smooth surface roughness, the two members are adhered by compression or joined by screw-fastening. Since the stator structure is mostly formed by a plurality of very thin silicon steels stacked together, the stator made of multiple layers of silicon steel material is difficult to be processed by mechanical cutting. Not only the cost is very high, but also the required precision tolerance size and surface roughness cannot be achieved by the contact surface. If the grinding manner is adopted to process and improve the size precision, the cost is higher than the mechanical cutting method, so the grinding method does not meet the economic benefit requirement. Therefore, the major concerns in the prior art include: generating the effective junction surface area between the stator and the disk-type stator seat and not achieving a high proportion of total contact between the two physical bodies. In the micro level, a lot of gaps exist between the stator and the disk-type stator seat. Since the thermal conductivity of the air is poor, the junction surface becomes the interface that prevents the heat of the stator from being transmitted to the stator seat. As the adhesive with high adhesion, high thermal conductivity and high thermal resistance has not been developed, the contact surface area between the stator and the disk-type stator seat is still not large enough. When the conventional method is applied in the high-power electric machine, due to the poor thermal conductivity, the temperature of the coil is too high, thus causing the limitation to the application power, and an axial flux disk electric machine of high-power density cannot be further developed, which is the biggest deficiency in the prior art.

Figure 1:
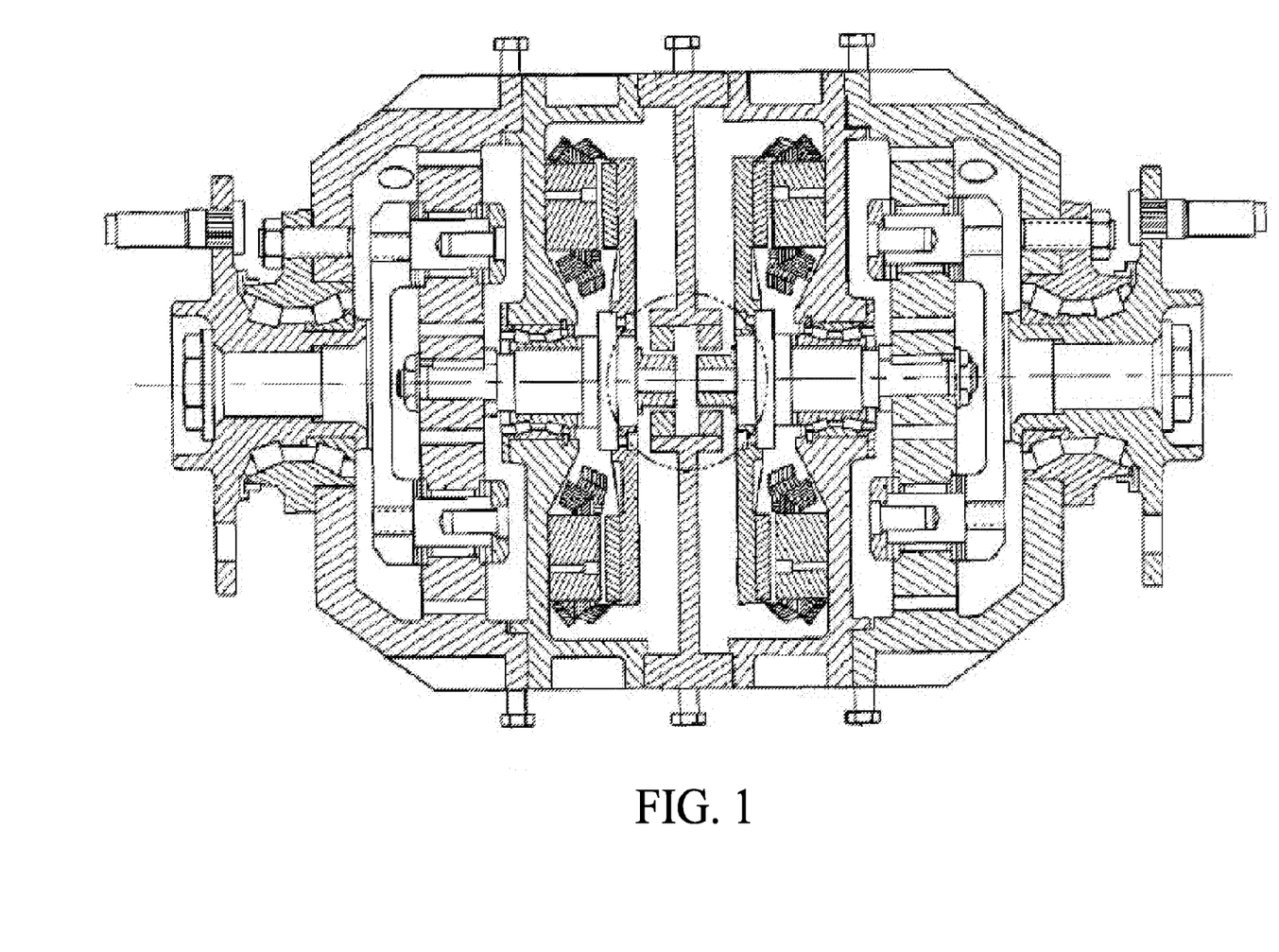
FIG. 1 is a schematic view illustrating a stator structure of an electric machine according to U.S. Pat. No. 6,922,004 B2.
Figure 2:
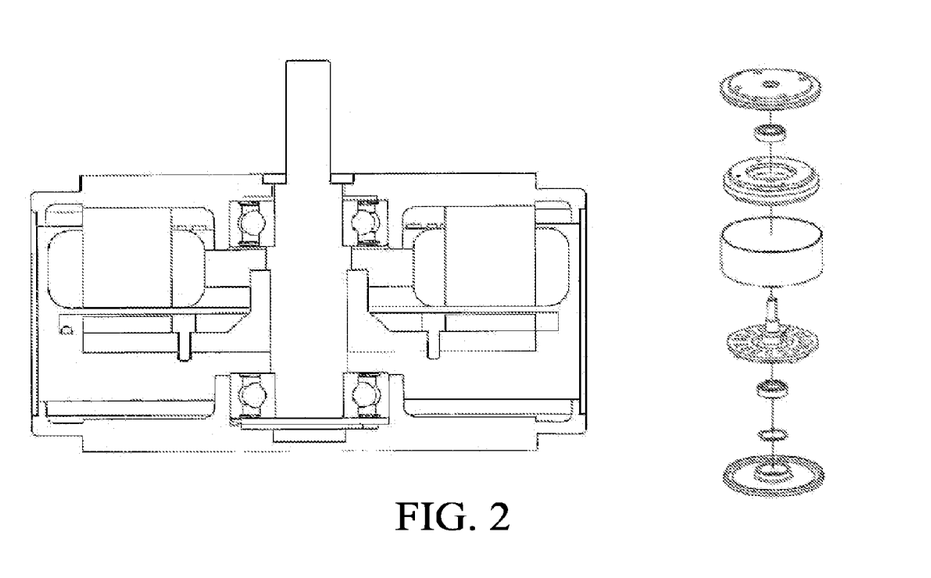
FIG. 2 is a schematic view illustrating a stator structure of an electric machine according to US Patent No. US 2010/0164316A1.
Figure 3:
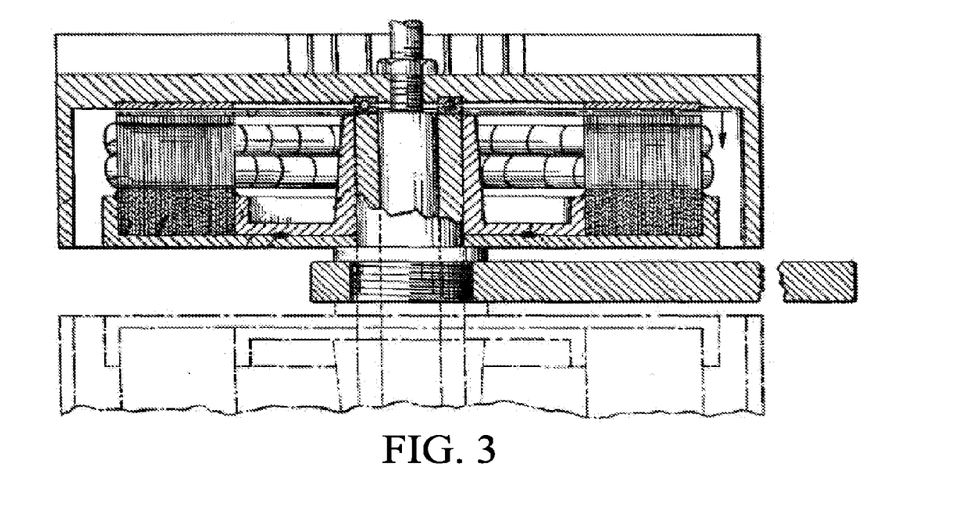
FIG. 3 is a schematic view illustrating a stator structure of an electric machine according to U.S. Pat. No. 3,061,075.
Figure 4:
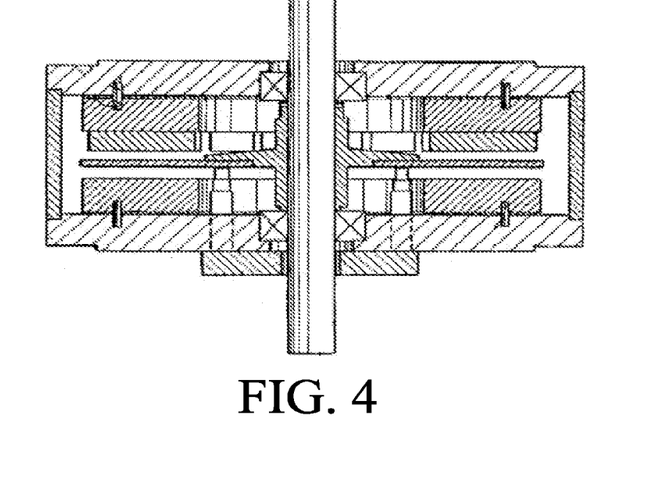
FIG. 4 is a schematic view illustrating a stator structure of an electric machine according to U.S. Pat. No. 5,646,467.
Figure 5:
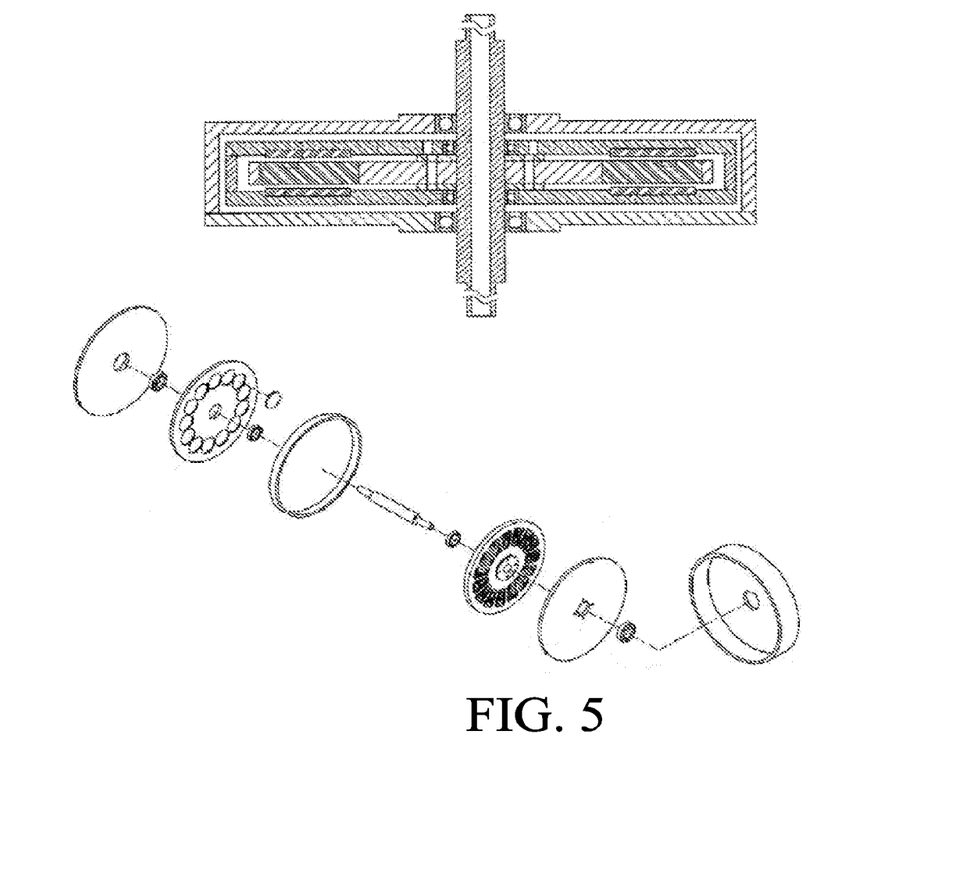
FIG. 5 is a schematic view illustrating a stator structure of an electric machine according to ROC Patent TW M389394U1.

The stator assembly structure of a conventional electric machine may refer to U.S. Pat. No. 6,922,004 B2 (The Timken Company, Canton, Ohio (US)) in FIG. 1, US Patent No. US-2010/0164316A1 (IN MOTION TECHNOLOGIES PTY LIMITED, Dandenong South, VIC (AU)) in FIG. 2, U.S. Pat. No. 3,061,075 (Charles Burchard Stegman, 5757 Tobias, Van Nuys, Calif. (US)) in FIG. 3, U.S. Pat. No. 5,646,467 (Kollmorgen Corporation, Waltham, Mass. (US)) in FIG. 4. The method for integrally casting the stator and the stator seat has not been disclosed in the prior art. According to the technical contents of FIG. 1, FIG. 2 and FIG. 4, the method of firmly binding the stator and the stator seat has not been disclosed, and also the technique of forming convex or concave tooth-like structures on the stator junction surface to enhance the binding force has not been disclosed. The stator has the conventional nut holes for fixing the stator on the motor casing with screws, so the heat dissipation between the stator and the stator seat is still unsatisfactory. FIG. 3 has not disclosed the technique of forming convex or concave tooth-like structures on the stator junction surface to enhance the binding force. The stator is fixed on the motor stator seat casing by a conventional welding method, so the heat dissipation between the stator and the stator seat is still unsatisfactory and needs modification.

Therefore, it is expected to improve the dissipation of heat of the stator and the coil rapidly to the disk-type stator seat and also enable the stator and the disk-type stator seat to be engaged together to form a firm structure, thereby ensuring the reliability of the machine.

In the present invention, to improve the dissipation of heat of the stator and the coil rapidly to the disk-type stator seat, the coefficient of thermal conductivity between the stator and the disk-type stator seat needs improvement. Under the condition of not increasing the cost, if the stator and the disk-type stator seat are tightly attached, the coefficient of thermal conductivity therebetween can be improved. There are technical difficulties in realizing the good contact state of the junction surface between the stator and the disk-type stator seat, and the best solution is one-piece casting or mold forming of the both. There are also difficulties in casting the stator and the disk-type stator seat together. Particularly, how to firmly bind the junction surfaces of the two members made of different materials is the crucial technique for solving the problems in the conventional stator assembly structure in the present invention.

SUMMARY

To solve the deficiencies in the prior art, the present invention provides a stator assembly structure for an axial flux electric machine architecture so as to form a junction surface of the stator and the disk-type stator seat with at least one engaged tooth-like structure. Since the stator manufactured by cutting or punching silicon steel may easily generate concave grooves or convex teeth on the axial surface of the stator, no matter whether the disk-type stator seat is formed by casting a metal material such as Al or Mg or mold-forming a non-metallic material with good thermal conductivity such as an engineering plastic. The stator of the present invention has the junction surface with the tooth-like structure like a groove channel that allows the high temperature liquid disk-type stator seat material to flow easily so as to enable the stator and the disk-type stator seat made of different materials to be integrated together by casting or mold forming, and also the tooth-like structure enables the junction surface of the stator and the disk-type stator seat to bear a larger rotation stress. The junction surface of the stator and the disk-type stator seat does not require the precise and expensive processing and special assembly process, so the implementation cost may be reduced, thus having a good competition capability on the commercial market.

The present invention is also directed to modify the stator formed by stacking multiple layers of thin silicon steel in the stator assembly of the conventional axial flux disk-type electric machine. This stator structure endures a larger axial suction of the rotator magnet. The silicon steels may be respectively staggered to cause the uneven axial plane. The present invention provides the solution to the above problems. A protrusion such as a round bar or a ferrous plate or a heat dissipation cooling water pipe is welded on a back iron of the stator, so that the silicon steel and the protrusion are combined to form a stator that is then cast with the disk-type stator seat to form one piece. The disk-type stator seat and the protrusion junction surface are formed into an engaged tooth-like structure to ensure that the stator is integrated with the disk-type stator seat to form a firm stator assembly structure. The stator assembly also has a good heat dissipation characteristic.

To achieve the above objectives, the present invention provides a stator assembly structure for an axial flux electric machine, which comprises a stator seat, a stator and at least one coil.

The stator seat is applicable to an outer rotator or inner rotator electric machine and has a central line perpendicular to the end surface.

The stator is combined with the stator seat to form at least one junction surface, and the stator and the stator seat have a common central line and have a groove on the other side relative to the junction surface of the stator and the stator seat.

The at least one coil is disposed in the groove of the stator and the coil is disposed around a coil normal line.

The stator structure has at least one convex or concave tooth on any junction surface of the stator and the stator seat so as to enable the stator and the stator seat to be firmly formed by using a one-piece cast method or a one-piece mold forming method.

To achieve the above objective, the present invention provides a stator assembly structure for an axial flux electric machine, which comprises a stator seat, a stator and at least one coil.

The stator seat is applicable to an outer rotator or inner rotator electric machine and has a central line perpendicular to the end surface.

The stator is combined with the stator seat to form at least one junction surface, and the stator and the stator seat have a common central line and have a groove on the other side relative to the junction surface of the stator and the stator seat.

The at least one coil is disposed in the groove of the stator and the coil is disposed around a coil normal line.

The stator structure has at least one fixing member disposed on any junction surface of the stator and the stator seat and fixed on the stator so as to enable the stator and the stator seat to be firmly formed by using a one-piece cast method or a one-piece mold forming method.

To achieve the above objectives, the present invention provides a stator assembly structure for an axial flux electric machine, which comprises a stator seat, a stator and at least one coil.

The stator seat is applicable to an outer rotator or inner rotator electric machine and has a central line perpendicular to the end surface.

The stator is combined with the stator seat to form at least one junction surface, and the stator and the stator seat have a common central line and have a groove on the other side relative to the junction surface of the stator and the stator seat.

The at least one coil is disposed in the groove of the stator and the coil is disposed around a coil normal line.

The stator structure has at least one metal water pipe or water jacket on any junction surface of the stator and the stator seat, and the at least one metal water pipe or water jacket is adjacent to the junction surface of the stator and extends to the periphery so as to enable the stator and the stator seat to be firmly formed by using a one-piece cast method or a one-piece mold forming method.

In order to further describe the present invention more deeply, the following drawings, drawing description, and detailed description of the present invention are intended to help the examiner in the examination.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed structures of the present invention and the connection relation thereof are described with reference to the following drawings so as to help the examiner understand the present invention.

The electric machine structure implemented by an axial flux stator assembly of high torque density of present invention is applicable to both the outer rotator and the inner rotator. The optimal method is partially combining the stator back iron (with the stator seat junction surface) and the stator seat, that is, the groove opening of the stator faces the outside to facilitate the assembling of the winding, i.e. the groove opening of the stator faces the rotator magnet. The stator, the stator seat, the rotator and the rotator seat have the same central line. This electric machine structure allows the winding side of the stator and the stator seat to be open during the assembling of the coil, which facilitates the assembling of the coil.

In some special applications, the electric machine structure of the present invention may omit the rotator seat, for example the outer rotator electric machine, where the rotator seat is connected to a hub and a spoke. The rotator is supported by the hub and the spoke, so the rotator seat is not required.

The electric machine of the present invention adopts the water cooling or air cooling type. If the water cooling type is for example the inner rotator electric machine, the water cooling structure of the inner rotator electric machine is formed by the stator seat added with a cooling water channel for guiding the flow of the cooling water and a water jacket cover plate for covering or a cooling water pipe in contact with the stator seat and guiding the flow of the cooling water. If the water cooling type is for example the outer rotator electric machine, the water cooling structure of the outer rotator electric machine is formed by a cooling water pipe in contact with the stator seat and guiding the flow of the cooling water.

The stator seat of the present invention may be formed by casting a metal material or mold-forming a non-metallic material with good thermal conductivity. The non-metallic material is formed by uniformly immersing metal particles with good thermal conductivity into the resin or plastic material. When the stator seat is formed by casting the metal material, during the casting, the stator is heated to approximately the casting metal liquid temperature, so as to facilitate the close attachment of the two materials and thus form the one-piece casting structure of the stator and the stator seat.

The stator of the present invention is preferably manufactured by the silicon steel. This stator is formed by punching and rolling the silicon steel strip and stacking into a disk with multiple grooves; and may also be formed by rolling and stacking the silicon steel strip into a pie and then cutting into the disk with multiple grooves. This stator may also be formed by a powder metallurgy process with a soft magnetic material, where a plurality of sectional identical single-slot pies or multi-slot pies are tenon-connected into an annular stator structure, thereby reducing the costs of the materials and the molds.

The tooth shape of the tooth-like structure of the stator of the present invention is not particularly limited and may be a square or trapezoid (dovetail) or arched dents or protrusions. The joining angle of the tooth-like base part close to the central line of the stator is preferably round angle or arched angle, so as to facilitate the fluent flow of the metal liquid while casting and prevent the air from being accumulated at the joining angle to cause holes with poor thermal conductivity.

Hereinafter, the embodiment of the stator assembly structure of the present invention applicable to the water cooling electric machine is described to illustrate the technique of the present invention.

Figure 6A:
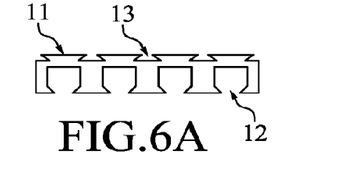
FIGS. 6A-6C are schematic views of a stator structure according to a first embodiment of the present invention.
Figure 6B:
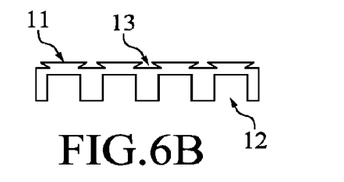
Figure 6C:
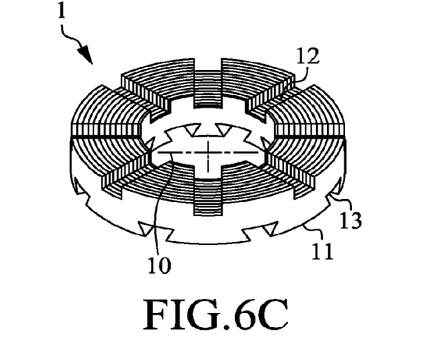
Figure 6D:
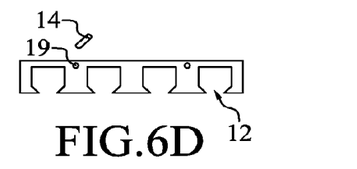
FIGS. 6D-6F are schematic views of a stator structure according to a second embodiment of the present invention.
Figure 6E:
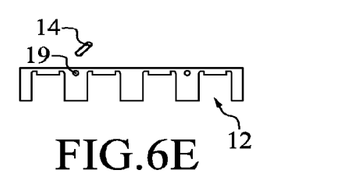
Figure 6F:
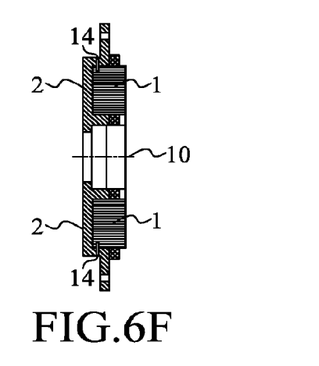

FIGS. 6A-6C are schematic views of a stator structure according to a first embodiment of the present invention. Referring to FIGS. 6A-6C, the stator 1 is formed by punching and rolling the silicon steel strip and stacking into a disk with multiple grooves, and may also be formed by rolling and stacking the silicon steel strip into pies and then cutting into the disk with multiple grooves. The stator 1 has a central line 10, a tooth-like part 11 formed by punching a silicon steel strip, an engaging slot 13 (a dovetail groove) and a shoe-coil accommodation slot 12 (as shown in FIG. 6A) with tooth or a shoe-coil accommodation slot 12 (as shown in FIG. 6B) without tooth. The tooth-like part 11 and the engaging slot 13 are fused-cast with the stator seat 2 into one piece and provide the fixing function. FIG. 6C is a three-dimensional view of FIGS. 6A and 6B. FIGS. 6D-6F are schematic views of a stator structure according to a second embodiment of the present invention. Referring to FIGS. 6D-6F, the engaging slot 13 may also be a round hole 19 and the round hole 19 is respectively disposed around the stator 1. The tenon 14 may be a column (as shown in FIGS. 6D and 6E). The tenon 14 is firstly fixed in the round hole 19 of the stator 1, and the stator 1 and the tenon 14 are fused-cast with the stator seat 2 into one piece (as shown in FIG. 6F). The tooth-like part 11 of the stator 1 is an inverted trapezoid concave structure with a small opening facing any junction surface. An included angle of the bottom of the tooth-like part 11 of the inverted trapezoid concave structure of the stator 1 is a fillet so as to enable the material of the stator seat to flow in the casting process to wrap the stator.

Figure 7:
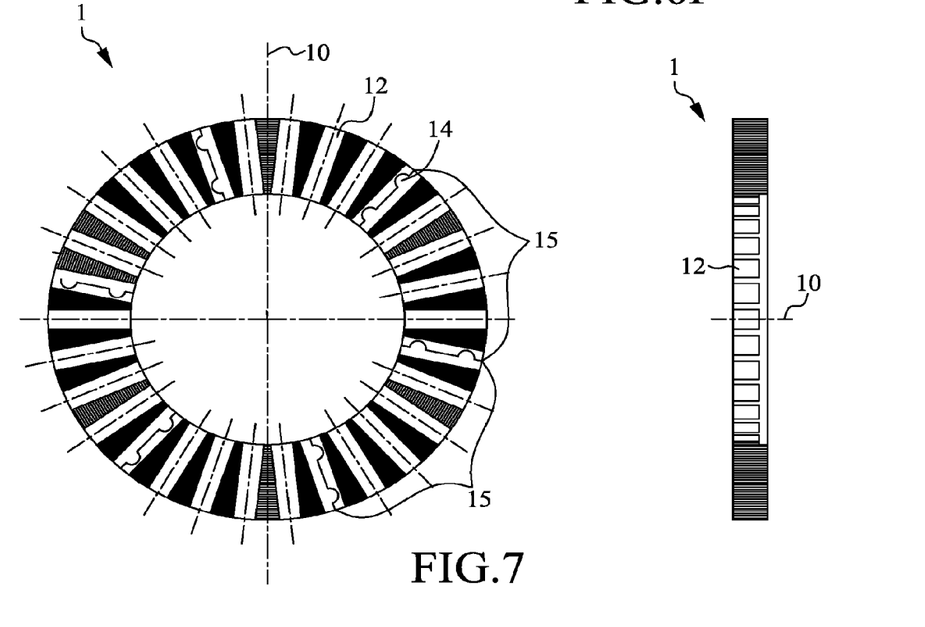
FIG. 7 is a schematic view of a stator structure according to a third embodiment of the present invention.

FIG. 7 is a schematic view of a stator structure according to a third embodiment of the present invention. Referring to FIG. 7, in mass production, if the annular silicon steel pie is fabricated by punching, the silicon steels with the ascending sizes are stacked to form the pie stator components 15 with the identical single or multiple coil accommodation slots 12 and the tenon 14 and the engaging slot 13. Then, the pie stator components 15 are connected by a plurality of sectional pie fixing members in the annular direction into the annular stator to form a complete-circle-shaped silicon steel. Each stator component 15 is buckled with the tenon 14 and the engaging slot 13 to avoid disengagement. The complete-circle-shaped silicon steels formed by the stator components 15 engaged together are stacked to form a barrel stator 1 in a manner of plane matching. The barrel stator 1 has a central line 10 and the pie may also be fabricated by a powder metallurgy process with a soft magnetic material. The pie is divided into a plurality of stator components 15 to be manufactured, thus reducing the costs of the material and the mold.

Figure 8:
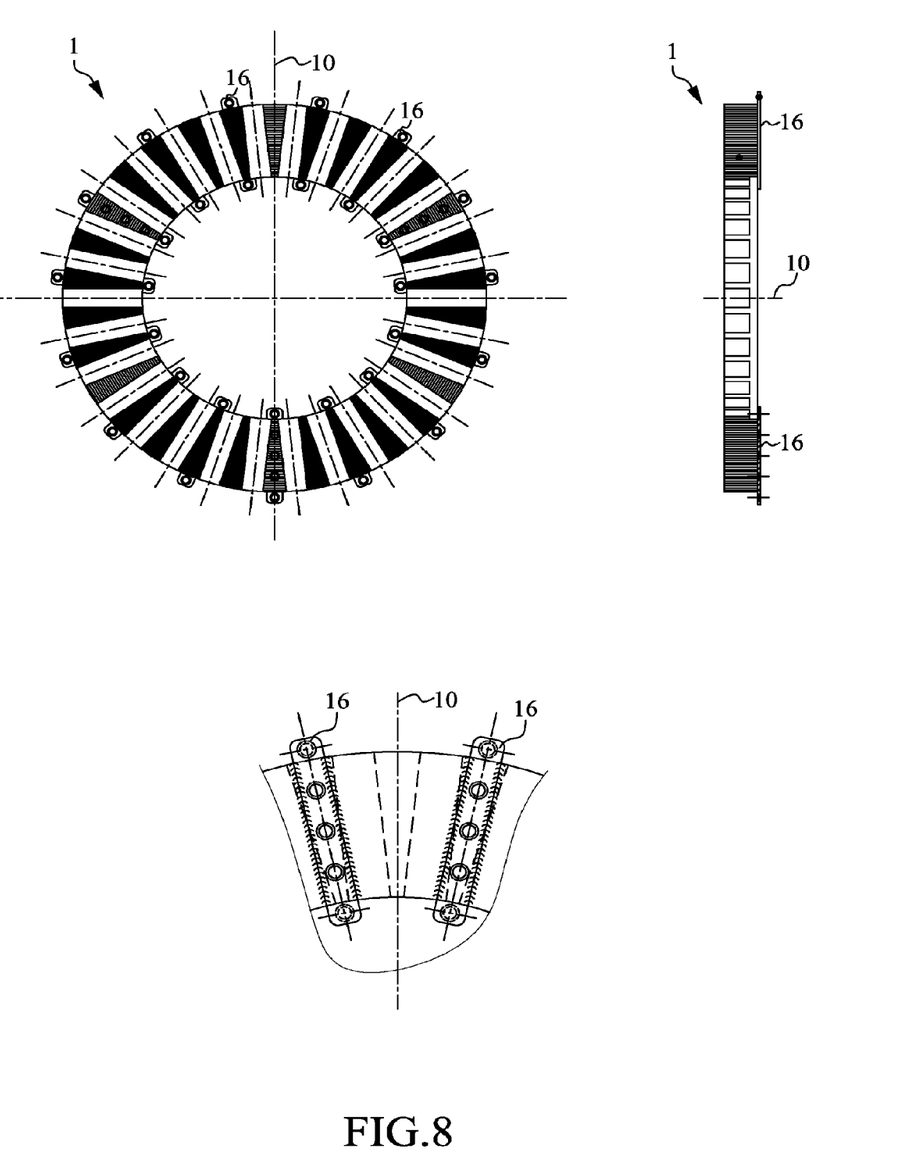
FIG. 8 is a schematic view of a stator structure according to a fourth embodiment of the present invention.

FIG. 8 is a schematic view of a stator structure according to a fourth embodiment of the present invention. Referring to FIG. 8, the fixing member 16 of the present invention may also be welded on the junction surface of the stator 1 and the stator seat by the steel sheet or round bar with a smaller size. The stacked pie silicon steel is welded on the steel sheet or round bar one by one without getting scattered, and the steel sheet is drilled with the round holes to enhance the combination force of engaging the stator 1 and the stator seat (not shown) and avoid getting loose. Or, the fixing member 16 may be a column, which is firstly fixed in the round hole of the stator and is fixed with the stator and the column to one piece during the fused-casting of the stator seat.

Figure 9:
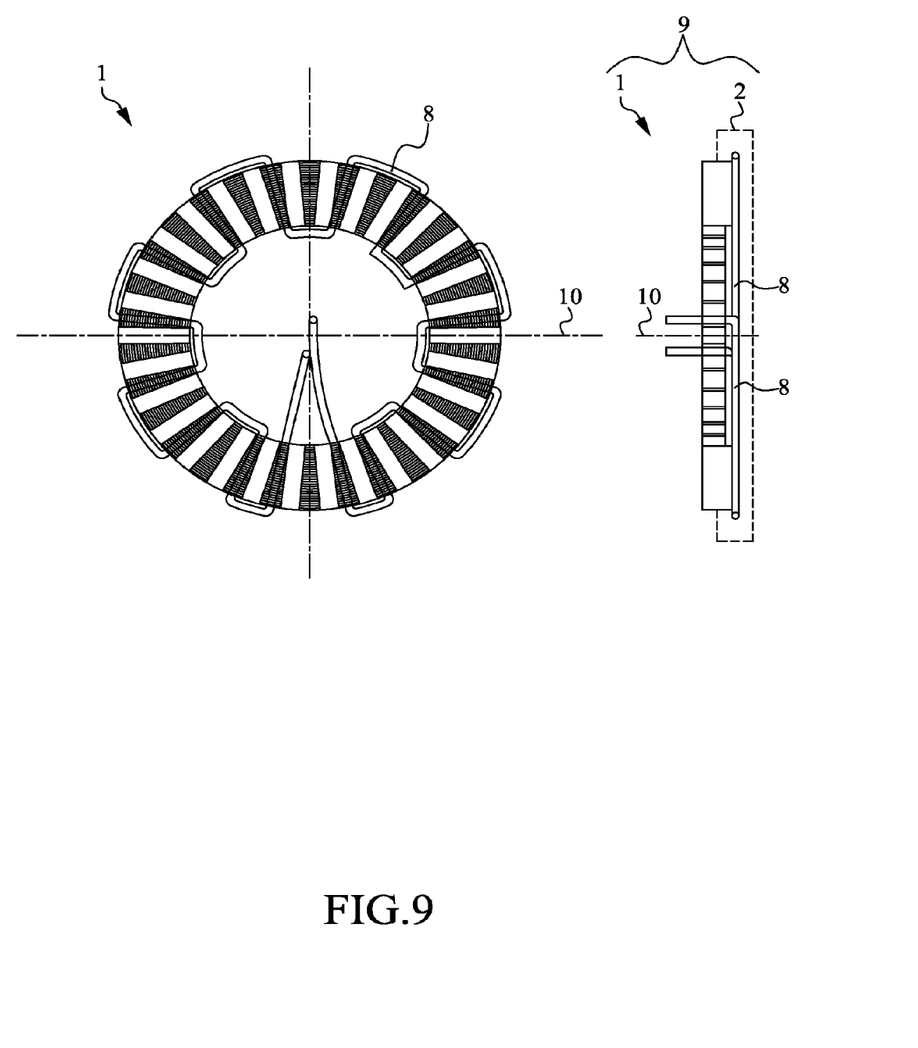
FIG. 9 is a schematic view of a combination of the stator and the stator seat with water cooling heat dissipation according to an embodiment of the present invention.

FIG. 9 is a schematic view of a combination of the stator and the stator seat with water cooling heat dissipation according to an embodiment of the present invention. Referring to FIG. 9, the stator 1, the cooling water pipe 8 and the stator seat 2 are connected into the one-piece stator assembly 9 by casting or mold forming, and formed into a combination of the stator and the stator seat with water cooling. The left and right sides of the stator 1 and the cooling water pipe 8 are welded in a sectional staggering manner, and the stator silicon steel is welded on the cooling water pipe 8 one by one without getting scattered. The cast stator seat (not shown) is buckled on the cooling water pipe 8 like the tenon (not shown) and the engaging slot (not shown) buckled together. In this manner, the stator 1, the cooling water pipe 8 and the stator seat 2 are tightly combined into one piece, thus improving the heat dissipation effect. The range of the stator 1 and the cooling water pipe 8 which are not welded together is formed into the groove to facilitate the inflow of the liquid material like Al liquid during the casting or mold forming, so as to enable the two materials of the stator 1 and the stator seat 2 to be fully, fluently and closely attached (i.e. form one-piece stator assembly 9) and avoid the deficiency of holes with poor thermal conductivity caused by air accumulated at the joining angle. When the stator seat 2 is applicable to the outer rotator electric machine, the stator seat 2 has a water pipe or water jacket structure on one side thereof. When the stator seat 2 is applicable to the inner rotator electric machine, the stator seat 2 has a heat dissipation fin or water jacket structure on one side thereof.

Figure 10:
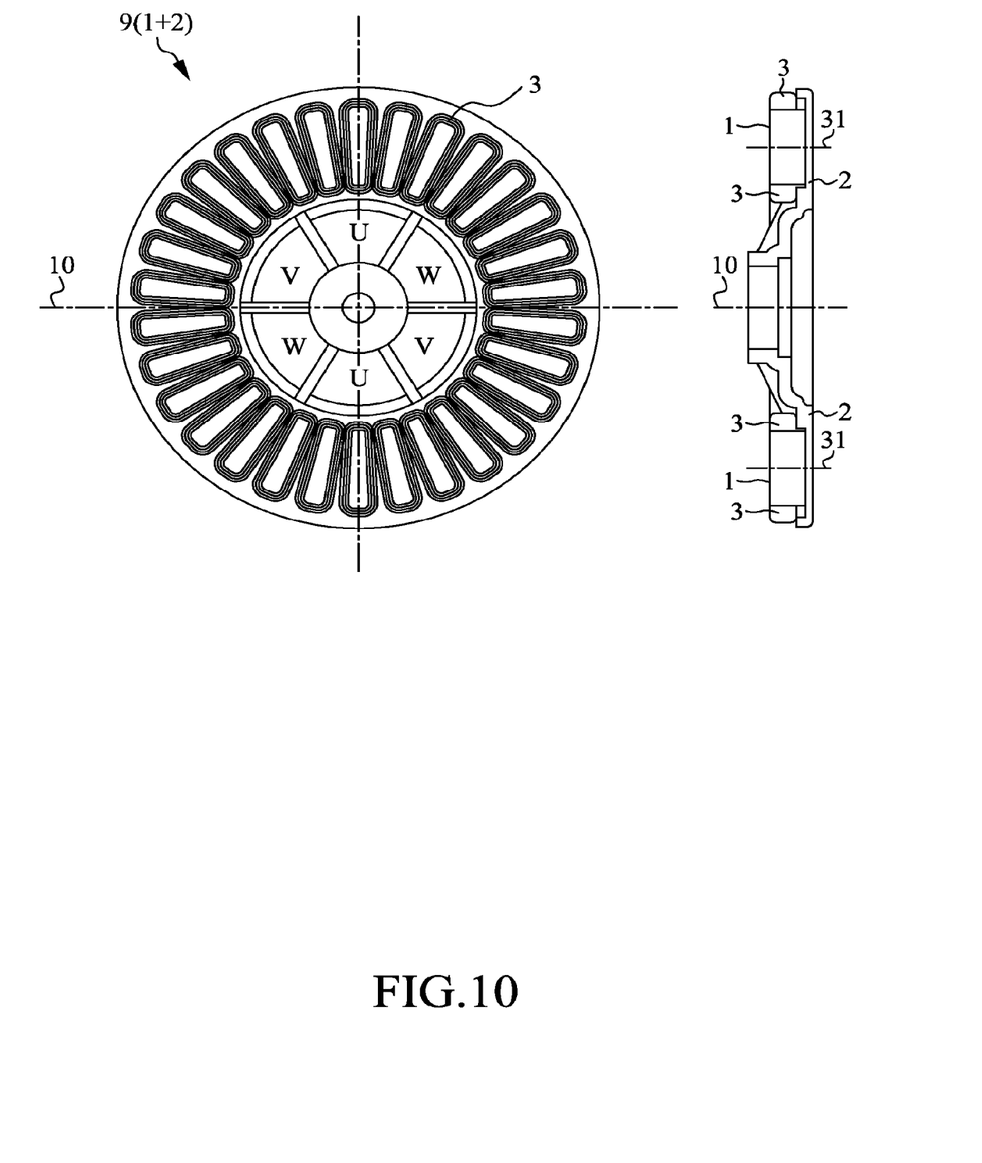
FIG. 10 is a schematic view of a coil set structure according to the present invention.

On the other side of the back iron (junction surface of the stator seat) of the stator 1, a plurality of grooves are formed, which are coil accommodation slots 12 for accommodating a plurality of coils 3 that is formed by at least one wire with good electrical conductivity wound surrounding a coil normal line 31. FIG. 10 is a schematic view of a coil set structure according to the present invention. Referring to FIG. 10, when functioning as the motor, if the coils 3 are conducted with current, the electromagnetic field generated by each coil 3 may circulate through the silicon steel of the stator 1 and form an electromagnetic loop surrounding the coils 3 via the coil normal line 15. The stator 1 and the stator seat 2 are integrally cast into a combination of the stator and the stator seat. The upper side of the combination presents an open state, and the winding of the coils 3 is conducted on the combination of the stator 1 and the stator seat 2, or the coils 3 are formed in another place and then are mounted in the coil accommodation slot 12 to form a stator assembly 9 and have a space parallel to the central line 10.

Figure 11:
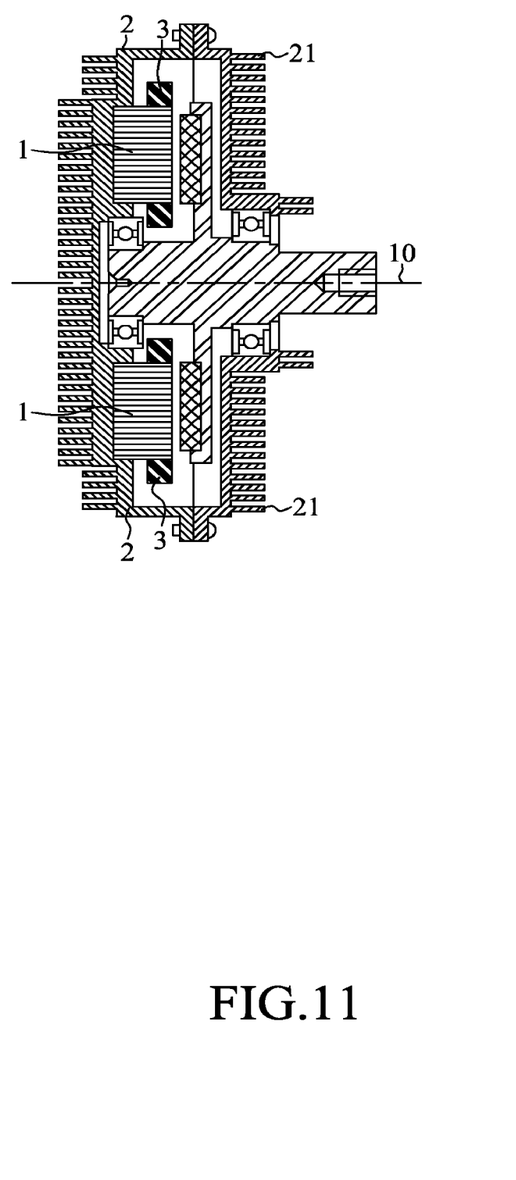
FIG. 11 is a schematic view of a structure of the stator and the stator seat with air cooling heat dissipation according to the present invention.

FIG. 11 is a schematic view of a structure of the stator and the stator seat with air cooling heat dissipation according to the present invention. Referring to FIG. 11, the stator 1 and the stator seat 2 having the air cooling heat dissipation fin and the front stator seat 21 having the air cooling heat dissipation fin are connected by using a one-piece cast method or a one-piece mold forming method, thus forming a combination structure of the stator 1 and the stator seat 2 with the air cooling. Then, the combination structure is assembled with the coils 3 to form the air cooling inner rotator electric machine. The technical principle thereof is the same as that of the water cooling outer rotator electric machine except that the stator seat adopts the water cooling or air cooling type. The embodiments of the present invention are described as above.

Figure 12:
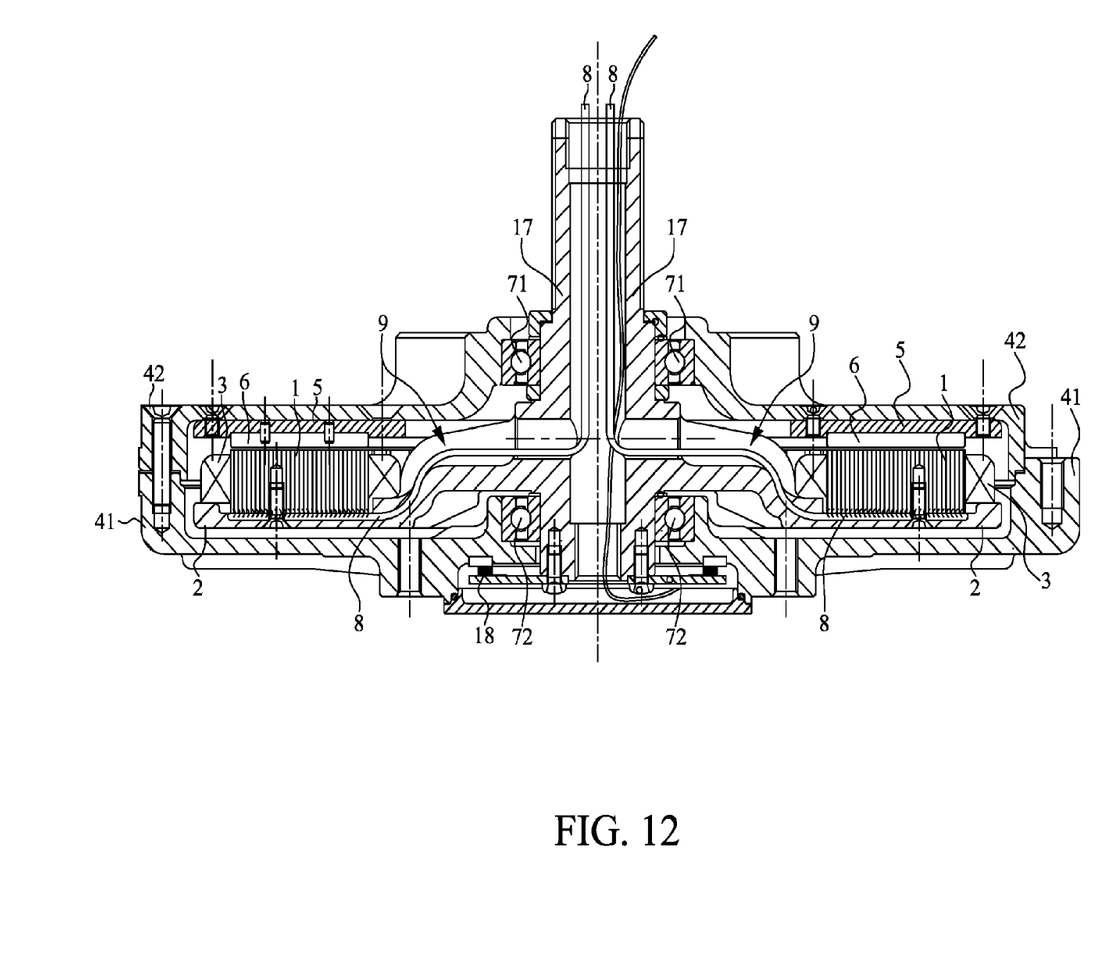
FIG. 12 is a schematic view of an electric machine assembly structure according to the present invention.

FIG. 12 is a schematic view of an electric machine assembly structure according to the present invention. Referring to FIG. 12, the stator assembly 9 is concentrically assembled with the rotator 5, the coils 3, the left rotator seat 41, the right rotator seat 42, the magnet 6, the front bearing 71, the rear bearing 72, the cooling water pipe 8, the stator fixing shaft 17 and a Hall sensor 18 with the central line 10 to form the water cooling outer rotator electric machine. The left rotator seat 41 and the right rotator seat 42 respectively seal the stator seat 2 having the cooling water pipe 8 at the left side and the right side. The cooling water pipe 8 has a plurality of water pipe joints (not shown) for water inflow and outflow, so as to guide the cooling water to flow into and out of the stator seat 2. The water pipe joint may be installed out of the water inlet and outlet pipe. The stator is formed by rolling at least one silicon steel sheet around the center, so that when the coils 3 are combined with the stator 1, the normal lines 31 of the coils are all parallel to the central line 10.

From the disclosure of FIG. 6 to FIG. 12, it is understood that the stator assembly of the axial flux electric machine of the present invention is designed for solving the coil heat dissipation problem inside the axial flux electric machine of high torque density and also reducing the cost of the machine while ensuring the reliability of the same. The back iron for each silicon steel disk stator used in the invention is formed into a specific structure with tooth-like protrusions for allowing the same to be integrated with the disk-type stator seat, while the disk-type stator seat can be made of a material suitable for casting or mold forming. Then, a coil is mounted on the stator, and a stator assembly can be achieved by integrating the stator, the coil and the stator seat. The stator and the disk-type stator seat of the stator assembly are manufactured by using a one-piece cast method or a one-piece mold forming method so as to enable the contact surfaces of the stator and the stator seat to engage with each other even more tightly and reliably, and consequently enable the heat generated from the coil to be transmitted rapidly from the disk stator to the disk-type stator seat, where the disk-type stator seat dissipates the heat by means of water cooling or air cooling. Whereby, the heat dissipation efficiency of the stator assembly of the electric machine is enhanced, the temperature of the stator coil of the axial flux electric machine of high torque density is reduced so that eventually working efficiency of the high-power electric machine is improved, not to mention that the lifespan of the same is increased and the failure probability that is induced by high-temperature burnout is reduced. In addition, since the stator assembly is integrally cast, the junction surface of the axial surface of the stator and the disk-type stator seat are capable of engaging with each other tightly enough that it is unnecessary to process the junction surface by using any precision machining process and warming compression process. Therefore, not only the cost for assembling the stator and the disk-type stator seat is reduced, but also the reliability of the machine is ensured as the stator can be ensured to tightly engage with the disk-type stator seat. The structure of the disk-type electric machine is substantially improved, and has an extremely good business opportunity. Therefore, the present invention is filed for claiming the patent protection.

In view of the above, the structure characteristics and embodiments of the present invention are disclosed in details and may fully reveal the progressive step of the objectives and effects of the present invention. The present invention has industry benefits and the application of the present invention has not been found in the market. According to the spirit of the patent law, the present invention fully meets the patent requirements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stator assembly structure for an axial flux electric machine, comprising:
    a stator seat, applicable to an outer rotator or inner rotator electric machine;
    a stator, combined with the stator seat to form at least one junction surface and having a groove on the other side relative to the junction surface of the stator and the stator seat; and
    at least one coil, disposed in the groove of the stator;
    wherein the stator structure has at least one convex or concave tooth-like part on any junction surface of the stator and the stator seat so as to enable the stator and the stator seat to be firmly formed by using a one-piece cast method or a one-piece mold forming method.

2. The stator assembly structure for an axial flux electric machine according to claim 1, wherein the stator is manufactured by punching and rolling a silicon steel strip and stacking into a disk with multiple grooves.

3. The stator assembly structure for an axial flux electric machine according to claim 1, wherein the stator is manufactured by a powder metallurgy process with a raw material of soft magnetic material.

4. The stator assembly structure for an axial flux electric machine according to claim 1, wherein the stator is manufactured by a plurality of sectional pie stator components connected into an annular stator structure.

5. The stator assembly structure for an axial flux electric machine according to claim 1, wherein the tooth-like part of the stator is an inverted trapezoid concave structure with a small opening facing any junction surface.

6. The stator assembly structure for an axial flux electric machine according to claim 5, wherein an included angle of a tooth-like bottom of the inverted trapezoid concave structure of the stator is a fillet so as to enable a material of the stator seat to flow in a casting process to wrap the stator.

* * * * *